(12) United States Patent
Mills

(10) Patent No.: US 9,294,728 B2
(45) Date of Patent: Mar. 22, 2016

(54) SYSTEM AND METHOD FOR ROUTING CONTENT

(75) Inventor: Brendon W. Mills, Austin, TX (US)

(73) Assignee: IMAGINE COMMUNICATIONS CORP., Frisco, TX (US)

( * ) Notice: Subject to any disclaimer, the term of this patent is extended or adjusted under 35 U.S.C. 154(b) by 1487 days.

(21) Appl. No.: 11/328,587

(22) Filed: Jan. 10, 2006

(65) Prior Publication Data

US 2007/0162945 A1 Jul. 12, 2007

(51) Int. Cl.

| | |
|---|---|
| H04N 7/173 | (2011.01) |
| H04N 21/2225 | (2011.01) |
| H04N 21/2343 | (2011.01) |
| H04N 21/2665 | (2011.01) |
| H04N 21/462 | (2011.01) |
| H04N 21/4782 | (2011.01) |
| H04N 21/482 | (2011.01) |
| H04N 21/61 | (2011.01) |

(52) U.S. Cl.
CPC ........ *H04N 7/17318* (2013.01); *H04N 21/2225* (2013.01); *H04N 21/2343* (2013.01); *H04N 21/2665* (2013.01); *H04N 21/4622* (2013.01); *H04N 21/4782* (2013.01); *H04N 21/4821* (2013.01); *H04N 21/6125* (2013.01)

(58) Field of Classification Search
USPC .................................................. 725/114–119
See application file for complete search history.

(56) References Cited

U.S. PATENT DOCUMENTS

| | | | |
|---|---|---|---|
| 4,509,073 A | 4/1985 | Baran et al. | |
| 5,093,718 A | 3/1992 | Hoarty et al. | |
| 5,220,420 A | 6/1993 | Hoarty et al. | |
| 5,319,455 A | 6/1994 | Hoarty et al. | |
| 5,361,091 A | 11/1994 | Hoarty et al. | |
| 5,412,720 A | 5/1995 | Hoarty | |
| 5,442,700 A | 8/1995 | Snell et al. | |
| 5,485,197 A | 1/1996 | Hoarty | |
| 5,526,034 A | 6/1996 | Hoarty et al. | |

(Continued)

FOREIGN PATENT DOCUMENTS

| | | |
|---|---|---|
| GB | 2369203 A | 5/2002 |
| WO | 99/07158 | 2/1999 |

(Continued)

OTHER PUBLICATIONS

Jun Xin, Chia-Wen, Lin, and Ming-Ting Sun, "Digital Video Transcoding," *Proceedings of the IEEE*, vol. 93, No. 1, pp. 84-97, Jan. 2005.

(Continued)

*Primary Examiner* — Nasser Goodarzi
*Assistant Examiner* — Fred Peng
(74) *Attorney, Agent, or Firm* — Tarolli, Sundheim, Covell & Tummino LLP

(57) ABSTRACT

A system for transmitting information to a display includes one or more content sources, a network, a content processor, and a display device. The content sources are each capable of transmitting content to a content router in first formats according to packet-based communication protocol. The network selectively couples content sources to the content processor. The content processor requests and receives content from a selected content source. The content processor then modifies the first formats and generates a video stream based on the received content and transmits the video stream to the display device. The display device then displays the video stream.

22 Claims, 8 Drawing Sheets

(56) References Cited

U.S. PATENT DOCUMENTS

| | | | |
|---|---|---|---|
| 5,550,578 A | 8/1996 | Hoarty et al. | |
| 5,557,316 A | 9/1996 | Hoarty et al. | |
| 5,587,734 A | 12/1996 | Lauder et al. | |
| 5,594,507 A | 1/1997 | Hoarty | |
| 5,812,665 A | 9/1998 | Hoarty et al. | |
| 5,822,537 A | 10/1998 | Katseff | |
| 5,883,661 A | 3/1999 | Hoarty | |
| 5,953,506 A | 9/1999 | Kalra et al. | 395/200.61 |
| 6,034,678 A | 3/2000 | Hoarty et al. | |
| 6,055,315 A | 4/2000 | Doyle et al. | |
| 6,064,377 A | 5/2000 | Hoarty | |
| 6,100,883 A | 8/2000 | Hoarty | |
| 6,177,931 B1* | 1/2001 | Alexander et al. | 725/52 |
| 6,205,582 B1 | 3/2001 | Hoarty | |
| 6,253,238 B1 | 6/2001 | Lauder | |
| 6,305,020 B1 | 10/2001 | Hoarty | |
| 6,345,279 B1 | 2/2002 | Li et al. | 707/104 |
| 6,407,680 B1 | 6/2002 | Lai et al. | 341/50 |
| 6,421,733 B1 | 7/2002 | Tso | |
| 6,490,627 B1 | 12/2002 | Kalra | |
| 6,498,897 B1 | 12/2002 | Nelson | |
| 6,510,513 B1 | 1/2003 | Danieli | |
| 6,593,860 B2 | 7/2003 | Lai et al. | 341/50 |
| 6,757,429 B2 | 6/2004 | Hu | |
| 6,823,082 B2 | 11/2004 | Hu | |
| 6,888,477 B2 | 5/2005 | Lai et al. | 341/50 |
| 6,904,168 B1 | 6/2005 | Steinberg | |
| 6,938,157 B2 | 8/2005 | Kaplan | |
| 6,963,972 B1 | 11/2005 | Chang | |
| 6,970,602 B1 | 11/2005 | Smith et al. | 382/232 |
| 7,088,823 B2 | 8/2006 | Fetkovich | |
| 7,093,277 B2 | 8/2006 | Perlman | 725/142 |
| 7,734,800 B2 | 6/2010 | Gupta | |
| 2001/0056460 A1 | 12/2001 | Sahota et al. | 709/201 |
| 2002/0006204 A1 | 1/2002 | England et al. | 380/269 |
| 2002/0087957 A1 | 7/2002 | Norris | |
| 2002/0120586 A1 | 8/2002 | Masaki et al. | 705/75 |
| 2002/0129140 A1 | 9/2002 | Peled | |
| 2002/0131496 A1 | 9/2002 | Vasudevan | |
| 2002/0138848 A1* | 9/2002 | Alao et al. | 725/109 |
| 2002/0172418 A1 | 11/2002 | Hu | |
| 2002/0194227 A1 | 12/2002 | Day et al. | 707/523 |
| 2003/0004880 A1 | 1/2003 | Banerjee et al. | 705/51 |
| 2003/0053702 A1 | 3/2003 | Hu | |
| 2003/0061369 A1 | 3/2003 | Aksu | |
| 2003/0105739 A1 | 6/2003 | Essafi | |
| 2003/0158969 A1 | 8/2003 | Gimson et al. | 709/246 |
| 2003/0185395 A1 | 10/2003 | Lee | |
| 2003/0196206 A1 | 10/2003 | Shusman | 725/91 |
| 2004/0003117 A1 | 1/2004 | McCoy et al. | 709/246 |
| 2004/0086039 A1 | 5/2004 | Reynolds | |
| 2004/0111476 A1 | 6/2004 | Trossen et al. | 709/206 |
| 2004/0133548 A1 | 7/2004 | Fielding | |
| 2004/0133927 A1 | 7/2004 | Sternberg | |
| 2004/0139233 A1 | 7/2004 | Kellerman et al. | 709/246 |
| 2004/0193648 A1 | 9/2004 | Lai et al. | 707/104.1 |
| 2005/0004997 A1 | 1/2005 | Balcisoy | |
| 2005/0060411 A1 | 3/2005 | Coulombe | |
| 2005/0132264 A1 | 6/2005 | Joshi et al. | 715/500.1 |
| 2005/0172127 A1 | 8/2005 | Hartung et al. | 713/167 |
| 2005/0198210 A1 | 9/2005 | Janik | |
| 2005/0213826 A1 | 9/2005 | Neogi | |
| 2005/0265395 A1 | 12/2005 | Kim et al. | 370/485 |
| 2005/0273598 A1 | 12/2005 | Silverbrook | |
| 2005/0286497 A1 | 12/2005 | Zutaut et al. | 370/352 |
| 2006/0015649 A1 | 1/2006 | Zutaut et al. | 709/246 |
| 2006/0026302 A1 | 2/2006 | Bennett et al. | 709/246 |
| 2006/0117379 A1 | 6/2006 | Bennett et al. | 726/3 |
| 2006/0136457 A1 | 6/2006 | Park | |
| 2006/0167803 A1 | 7/2006 | Aydar | |
| 2006/0168227 A1 | 7/2006 | Levine | |
| 2006/0168323 A1 | 7/2006 | Kim et al. | 709/238 |
| 2006/0179472 A1 | 8/2006 | Chang et al. | 726/2 |
| 2006/0242318 A1* | 10/2006 | Nettle et al. | 709/238 |
| 2006/0265657 A1 | 11/2006 | Gilley | 715/730 |
| 2007/0067725 A1* | 3/2007 | Cahill et al. | 715/733 |
| 2007/0124816 A1 | 5/2007 | Abigail | 726/24 |
| 2007/0186005 A1 | 8/2007 | Setlur | |
| 2007/0255659 A1 | 11/2007 | Yen | |
| 2008/0016185 A1 | 1/2008 | Herberger | |
| 2008/0091845 A1 | 4/2008 | Mills | |
| 2008/0141303 A1* | 6/2008 | Walker et al. | 725/39 |
| 2008/0195698 A1 | 8/2008 | Stefanovic | |
| 2008/0195761 A1 | 8/2008 | Jabri | |
| 2008/0231480 A1 | 9/2008 | Lai | |
| 2008/0235200 A1 | 9/2008 | Washington | |
| 2009/0013414 A1 | 1/2009 | Washington | |
| 2009/0083279 A1 | 3/2009 | Hasek | |
| 2009/0119322 A1 | 5/2009 | Mills | |
| 2009/0164601 A1 | 6/2009 | Swartz | |
| 2009/0232220 A1 | 9/2009 | Neff | |
| 2010/0070608 A1 | 3/2010 | Hosur | |
| 2010/0094931 A1 | 4/2010 | Hosur | |
| 2010/0185776 A1 | 7/2010 | Hosur | |

FOREIGN PATENT DOCUMENTS

| | | |
|---|---|---|
| WO | 02/082271 | 10/2002 |
| WO | 03/032136 | 4/2003 |
| WO | 03/073370 | 9/2003 |
| WO | 2004/077790 | 9/2004 |
| WO | 2005/006768 | 1/2005 |
| WO | 2005/046140 | 5/2005 |
| WO | 2006/134310 | 12/2006 |
| WO | 2007/053957 | 5/2007 |
| WO | 2007/063485 | 6/2007 |
| WO | 2009/024926 | 2/2009 |

OTHER PUBLICATIONS

"Akimbo adds RSS feeds to video-on-demand service," *Online Reporter*, No. 455, 2 pages, Aug. 6, 2005.

Alan Bezoza and Brian Coyne, "How the Internet Will Disrupt the Long-Term Video Value Chain," *Friedman, Billings, Ramsey & Co., Inc.*, 27 pages, Oct. 6, 2005.

U.S. Appl. No. 11/549,226, filed Oct. 13, 2006, entitled "System and Method for Processing Content," 54 pages.

U.S. Appl. No. 11/936,548 entitled "System and Method for Managing Content," filed Nov. 7, 2007, 35 pages.

APEC eSecurity Task Group, "Guidelines to Issue Certificates Capable of Being Used in Cross Jurisdictional eCommerce," *APEC*, Dec. 2004.

Färber, Nikolaus et al., "Adaptive progressive download based on the MPEG-4 file format," *Journal of Zhejiang University Science A* (Suppl I), 2006.

Kantarci, Aylin et al.; "Rate adaptive video streaming under lousy network conditions;" *Signal Processing: Image Communication 19*, Mar. 22, 2004.

PCT Notification of Transmittal of the International Search Report and the Written Opinion of the International Searching Authority, or the Declaration with attached PCT International Search Report and the Written Opinion of the International Searching Authority in International Application No. PCT/US2008/055079, Sep. 4, 2008.

PCT Notification of Transmittal of the International Search Report and the Written Opinion of the International Searching Authority, or the Declaration with attached International Search Report and the Written Opinion of the International Searching Authority in International Application No. PCT/US2009/060590, Jan. 22, 2010.

PCT Notification of Transmittal of the International Search Report and the Written Opinion of the International Searching Authority, or the Declaration with attached PCT International Search Report and the Written Opinion of the International Searching Authority in International Application No. PCT/US2009/056310, Nov. 17, 2009.

PCT Notification of Transmittal of the International Search Report and the Written Opinion of the International Searching Authority, or the Declaration with attached PCT International Search Report and the Written Opinion of the International Searching Authority in International Application No. PCT/US2010/021474, Apr. 26, 2010.

Schierl, Thomas et al.; "Mobile Video Transmission Using Scalable Video Coding;" *IEEE Transactions on circuits and Systems for Video Technology*; 17:9; pp. 1204-1217, Sep. 2007.

(56) References Cited

OTHER PUBLICATIONS

Singer et al., "ISO Media File format specification," *International Organisation for Standardisation ISO/IEC* 14496-1:2001/Amd. 3, Oct. 31, 2008.
Office Action for U.S. Appl. No. 12/578,773, Dec. 13, 2010.
Office Action for U.S. Appl, No. 12/208,122, Oct. 29, 2010.
Office Action for U.S. Appl. No. 11/772,582, Dec. 21, 2010.
Office Action for U.S. Appl. No. 11/772,582, Jun. 28, 2010.
Office Action for U.S. Appl. No. 11/688,936, Aug. 7, 2009.
Office Action for U.S. Appl. No. 11/549,226, Sep. 30, 2010.
Office Action for U.S. Appl. No. 11/549,226, Mar. 1, 2010.
Office Action for U.S. Appl. No. 11/936,548, Jan. 5, 2010.
Office Action for U.S. Appl. No. 12/208,122, Apr. 19, 2011.
Office Action for U.S. Appl. No. 11/549,226, Apr. 20, 2011.
Office Action for U.S. Appl. No. 12/690,166, Mar. 24, 2011.
Office Action for U.S. Appl. No. 12/578,773, Jun. 28, 2011.
Official Action in U.S. Appl. No. 11/549,226 dated Aug. 3, 2009, 36 pages.

* cited by examiner

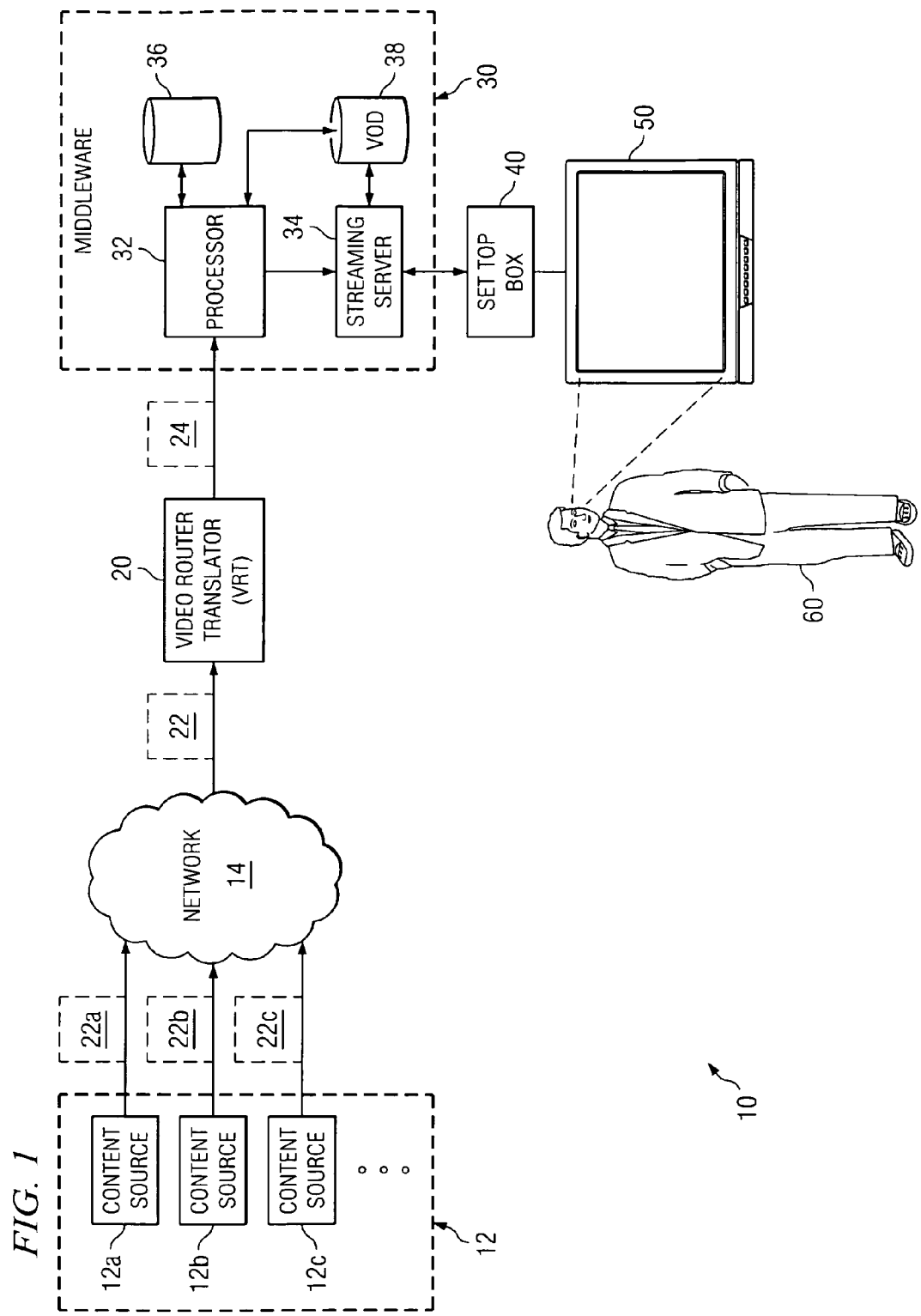

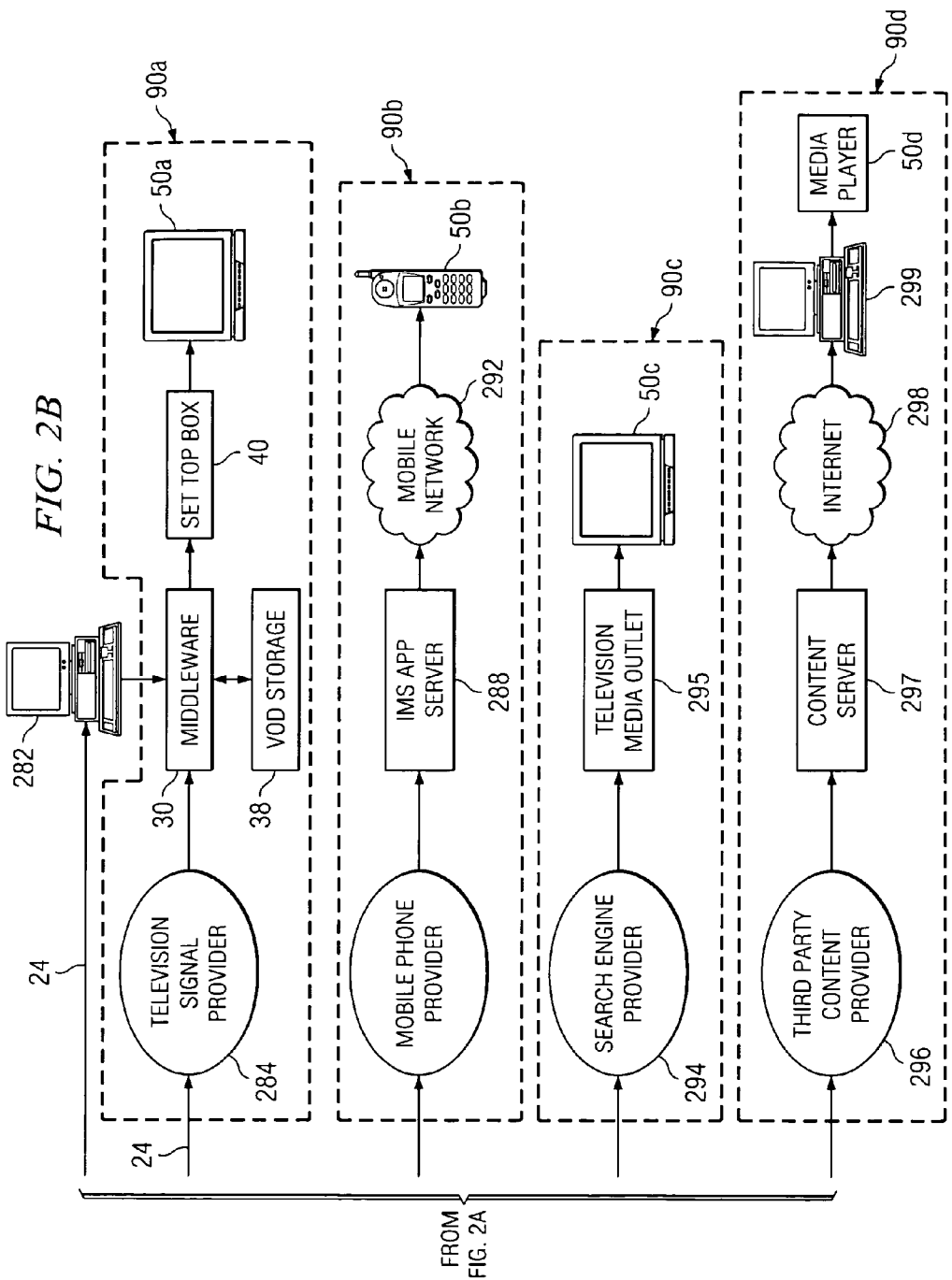

| TV GUIDE PAGE | | | |
|---|---|---|---|
| CHANNEL | 4:00 | 4:30 | 5:00 |
| KXYZ 8 | GARDENING | GARDENING | NEWS |
| KABC 13 | FISHING | FISHING | TENNIS |
| KBCA 40 | GOLF | GOLF | LOCAL NEWS |
| CNN 150 | NEWS | HISTORY | NATIONAL NEWS |
| FOXN 175 | NEWS | NEWS | SPECIAL REPORT |
| RSS 1300 | < RSS ACCESS ON DEMAND > | | |
| PUBLIC ACCESS RSS | < PUBLIC ACCESS RSS > | | |
| VLOG ON DEMAND | < VLOG ON DEMAND > | | |

*FIG. 3*

RSS ACCESS ON DEMAND

◇ MY SPACE.COM — 410

AOL PHOTO SLIDESHOW — 410

FLICKER PHOTO SLIDESHOW — 410

IFILM VIDEO LIBRARY — 410

FACEBOOK.COM — 410

*FIG. 4*

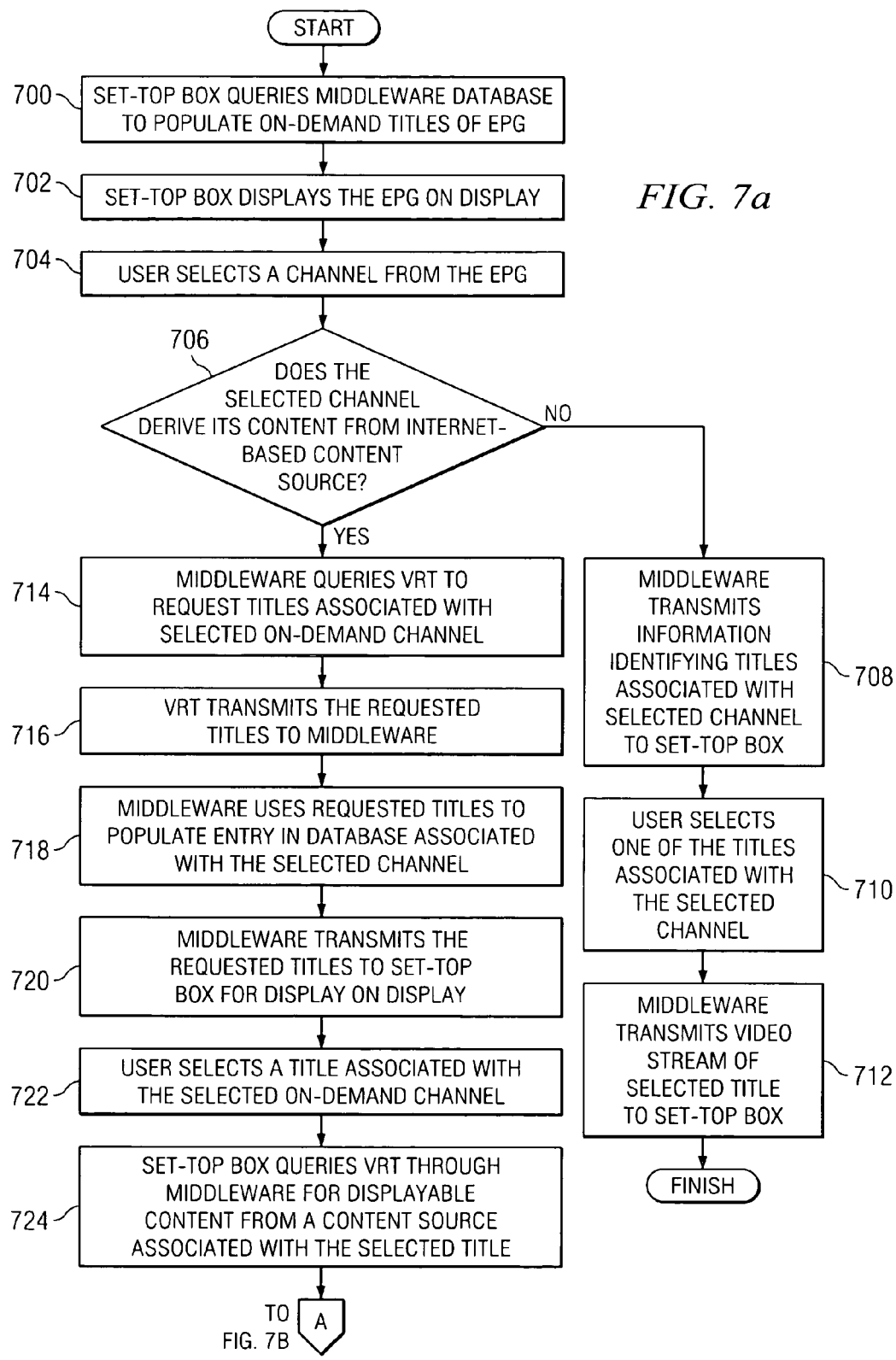

US 9,294,728 B2

SYSTEM AND METHOD FOR ROUTING CONTENT

TECHNICAL FIELD OF THE INVENTION

This invention relates in general to multimedia-content delivery systems, and more particularly, to a method and system for routing and translating content from one viewing media to another.

BACKGROUND OF THE INVENTION

The rapid growth in Internet usage that has occurred in the last several years has given users access to a substantial number and types of sources for text, audio, video, and multimedia content provided in many different formats. For many users, however, locating and accessing appropriate sources creates difficulties. Many users lack the technical capabilities to find sources of interest and to determine the appropriate techniques for accessing the content provided by these sources. Additionally, for many users, computers and other traditional devices for accessing Internet content are not preferred options for viewing particular types of content. For example, it would be advantageous for a TV viewer or a video cell phone user to be able to access and view Internet content. As a result, many types of Internet-provided content are underutilized.

SUMMARY OF THE INVENTION

In accordance with the present invention, the disadvantages and problems associated with content delivery systems have been substantially reduced or eliminated. In particular, a content-delivery system is disclosed that provides flexible techniques for expanding the quantity and type of content available to users.

In accordance with one embodiment of the present invention, a system for transmitting information to a display device includes one or more content sources, a network, a content router and translator, and a display device. The content sources are each capable of transmitting content to the content router in different formats according to packet-based communication protocols. The network selectively couples outputs from content sources to the content router. The content router requests and receives content from a selected content source. The content router then translates the format and generates a video stream based on the received content and transmits the video stream to the display device. The display device then displays the video stream.

Technical advantages of certain embodiments of the present invention include the ability to provide several types of content to display devices possessing varying capabilities. Additionally, particular embodiments of the present invention may significantly increase content available to video-on-demand users without increasing storage costs, create customer-stickiness for content providers by providing easier access to particular sources of content, increase cost efficiency by reducing the need for multiple format and bit-rate content storage, enable new wireless and handheld device markets by dynamically adjusting format and bit rates, and enable customized simultaneous displays from multiple content sources. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a system for providing content from multiple content source to a display device through a content router and translator;

FIGS. 2A and 2B collectively represent a block diagram showing the environment and contents of the content router and translator according to a particular embodiment;

FIG. 3 is an illustration of an example electronic programming guide (EPG) that may appear on a user's TV display;

FIG. 4 is an illustration of an Internet video-on-demand selection from the EPG of FIG. 3;

DETAILED DESCRIPTION OF THE INVENTION

Figure 2A:
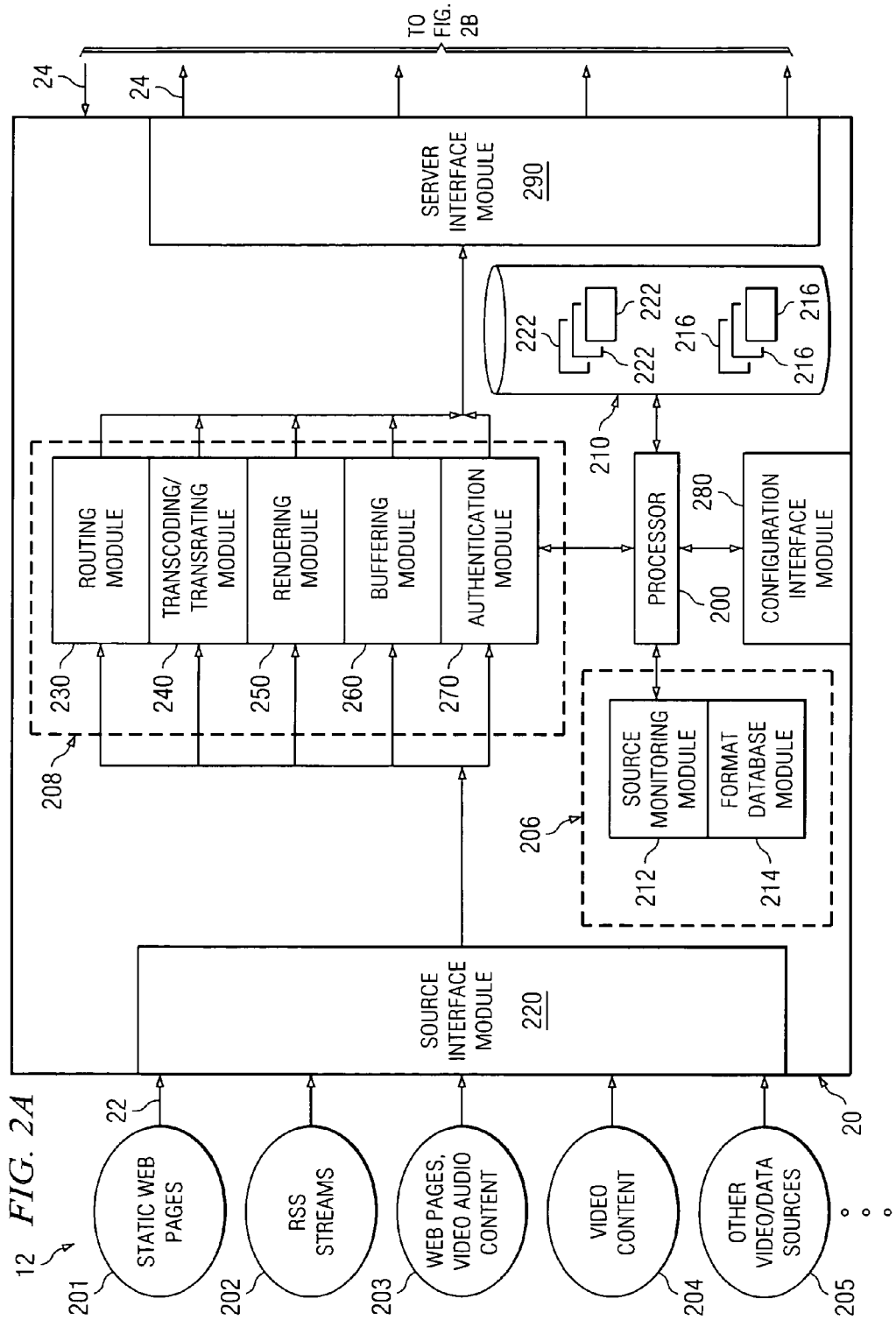

FIG. 1 illustrates a system 10 for providing content from content sources 12a-c through the network 14 through processor or video router and translator (VRT) 20. The translated video content is then routed through middleware 30 to a set top box 40 for display on display 50 to the user 60. In general, the VRT 20 facilitates interaction between content sources 12a-c and middleware 30 to set-top box 40 for the provision of video, audio, and/or text-based content to display 50 for viewing by user 60. Because the VRT 20 is capable of accessing content from a large number of content sources 12, processing such content, and delivering the processed content to the set top box 40 for display on display 50, VRT 20 may provide display 50 with access to a greater quantity and range of content.

VRT 20 routes content provided by content sources 12 to a middleware processor 32 which controls a streaming server 34 which sends content to set-top box 40 for display by display 50. Middleware 30 also includes a database 36 and a video on-demand (VOD) storage 38. As described in greater detail below, VRT 20, in particular embodiments, may receive content of a first type and/or format (shown diagrammatically in FIG. 1 as original content 22a-c) and convert the content to an appropriate type and/or format for display by display 50 (shown diagrammatically in FIG. 1 as displayable content 24). It will be understood that content sources 12 may have a wide variety of forms and characteristics that are not compatible for transmission by streaming server 34.

In converting content from the first type and/or format to the second type and/or format, VRT 20 modifies and changes original content 22 as required to enable it to be streamed by streaming server 34 for viewing on display 50. In particular embodiments, VRT may transcode original content 22a received from content sources 12. Specific non-limiting examples of such transcoding may found in "Digital Video Transcoding," *Proceedings of the IEEE* (January 2005), Jun Xin, et al., which is incorporated herein by reference. More generally, however, VRT 20 may translate, transcode, transrate, encode, render, and/or process or otherwise modify received original content 22 in any appropriate manner to facilitate display by display 50. Such manipulation of the data will be hereinafter termed and encompassed by the terms "processing," "modifying" or "translating". Furthermore, VRT 20 may include any appropriate combination of hardware and/or software suitable to provide the described functionality. The contents of a particular embodiment of VRT 20 are described in greater detail below with respect to FIGS. 2A and 2B.

Streaming server 34 receives displayable content 24 from VRT 20, combines displayable content 24 with other content provided by streaming server 34, and transmits displayable content 24 to display 50. In particular embodiments, streaming server 34 is operated by cable television, satellite television, IPTV service providers or other type of television service provider, and VRT 20 transmits displayable content 24 to streaming server 34 as a video stream. Streaming server 34 may then provide displayable content 24 to display 50 as part of a video-on-demand (VOD) subscription service for viewing on particular types of display 50, such as a television or portable communication devices. Streaming server 34 may additionally store on VOD storage 38 some or all of displayable content 24 received from VRT 20 for subsequent display by display 50. Streaming server 34 may include any appropriate combination of hardware and/or software suitable to provide the described functionality.

Middleware 30 may comprise any one of a number of current commercial products such as those provided by Tandberg N2, Sea Change, Bit Band, Concurrent, Entone, Kasenna or Microsoft Corporation. Such commercial middleware products are used by satellite, cable, IPTV or other service providers to provide electronic program guide (EPG) services to the customers of the service providers. A common usage of such middleware products is thus to provide to TV viewers EPG displays of available TV channels for viewing, and then to obtain and transmit the selected TV channels for viewing in response to user requests. FIGS. 3-6 illustrate examples of EPG displays that may be utilized in particular embodiments of system 10.

Set-top box 40 receives displayable content 24 from VRT 20, combines displayable content 24 with other content received by set-top box 40, and displays displayable content 24 on display 50. In particular embodiments, set-top box 40 may include storage media and appropriate control hardware, such as a digital video recorder (DVR), to allow user 60 to record selected portions of displayable content 24. In particular embodiments, set-top box 40 may be co-located with display 50 and may operate as an alternative or a supplement to streaming server 34. Set-top box 40 may include any appropriate combination of hardware and/or software to suitable to provide the described functionality.

Content sources 12a-c generate, store, and/or transmit original content 22a-c to VRT 20. As noted above, content sources 12a-c may provide text, image, video, audio, and/or any other appropriate types of original content 22. For purposes of example, the embodiment of system 10 shown in FIG. 1 might include a first content photograph repository (content source 12a), a weblog provider (content source 12b), and video weblog ("vlog") provider (content source 12c). In particular embodiments, content sources 12 represent web servers capable of serving original content 22 to users communicating with content sources 12 through the Internet. In such embodiments, content sources 12 may be configured to interact with VRT 20, and other devices requesting content, using the Hypertext Transport Protocol (HTTP) or other protocol. In general, communication system 10 may include any appropriate combination of hardware and/or software suitable to provide the described functionality.

As noted, display 50 receives displayable content 24 from streaming server 34 and displays displayable content 24 to user 60. Display 50 may represent any type of device appropriate to display the type of content being utilized in system 10. Examples of display 50 may include, but are not limited to, televisions, computers, video-enabled telephones, media players (such as audio- and/or video-capable iPods) and portable communication devices. In general, however, display 50 may include any appropriate combination of hardware and/or software suitable to provide the described functionality. Additionally, although FIG. 1 shows only a single display 50, system 10 may include any appropriate number of displays 50 receiving displayable content 24 from VRT 20 or other content routers in system 10.

Network 14 represents any form of communication network supporting circuit-switched, packet-based, and/or any other suitable type of communication and may comprise one or more separate networks. Links between VRT 20, middleware 30 and set-top box 40 represent any appropriate communication links over which displayable content 24 may be transmitted. Network 14 and the illustrated links may include routers, hubs, switches, gateways, call controllers, and/or any other suitable component in any suitable form or arrangement. In general, network 14 may comprise any combination of public or private communication equipment such as elements of PSTN, a global computer network such as the Internet, a local area network (LAN), a wide-area network (WAN), or other appropriate communication equipment. In particular embodiments, network 14 comprises all or a portion of the Internet and content sources 12 communicate with VRT 20 using packet-based communication protocols.

Links between the VRT 20, middleware 30 and set-top box 40 represent any appropriate form of communication links over which displayable content 24 may be transmitted. In particular embodiments, such device links may represent wireless communication links and any appropriate transmitters suitable for communicating displayable content 24 to display 50. As a result, display 50 may represent a portable communication such as a video-enabled mobile telephone.

Although FIG. 1 illustrates a particular embodiment of system 10 that includes a particular number and arrangement of each component, system 10 may include any appropriate number of VRTs 20, streaming servers 34, set-top boxes 40, and displays 50. For example, in particular embodiments, system 10 may include multiple displays 50 all receiving displayable content 24 simultaneously from streaming server 34. Additionally, in particular embodiments, VRT 20 may supply displayable content 24 to multiple different vendors, with each vendor operating one or more streaming servers 34 to provide displayable content 24 to its respective customers. Moreover, although the description below focuses on the operation of a particular embodiment of system 10 that utilizes a centrally-located streaming server 34 to provide content from VRT 20 to one or more displays 50, particular embodiments of system 10 may include set-top boxes 40 that are capable of providing, at the premise of user 60, similar functionality to that provided by streaming server 34 in the description that follows. As a result, particular embodiments of system 10 may include either or both of streaming server 34 and set-top box 40.

In operation, video router translator (VRT) 20 requests original content 22 from one or more content sources 12 for user 60 of display 50. VRT 20 may be configured to periodically request original content 22 from particular content sources 12. Additionally, as described further below, user 60 may provide configuration information and/or other input to control the content sources 12 from which VRT 20 requests original content 22 and/or the particular original content 22 requests from particular content sources. In particular embodiments, VRT 20 may operate as an HTTP client and may use HTTP requests to request original content 22 from content sources 12. More generally, however, VRT 20 may utilize any suitable technique for requesting original content 22. Furthermore, VRT 20 may receive original content 22 of any appropriate type and/or format including, but not limited to, text-based content such as Really Simple Syndication (RSS) feeds, extensible Markup Language (XML) or Hyper-Text Markup Language (HTML) files; image data such as Joint Photographic Experts Group (JPEG) or Tagged Image File Format (TIFF) files; video content such as Moving Picture Experts Group (MPEG) or Windows Media Video (WMV); and/or audio content such as Waveform audio (WAV), MPEG-1 Audio Layer 3 (MP3), and/or Windows Media Audio (WMA) files or streams; and/or content of any other appropriate type or format from content sources 12. For example, a particular embodiment of VRT 20 may be specifically configured to receive original content 22 in any of Microsoft DV, Video for Windows, DirectShow, QuickTime, MPEG-2, MPEG-4, Windows Media, DivX, MP3, PCM WAV, AVISynth script, Audio Compression Manager (ACM), Macromedia Flash, RealVideo, VOB (DVD-Video image), Windows bitmap (BMP), TGA, TIFF, Portable Network Graphics (PNG), and JPEG for processing, modifying or converting to and output as one or more of an MPEG-2, MPEG-4, or SDI-encoded video stream.

After receiving the requested original content 22, since the content 22 may be in any one of a number of different types or formats and have any of a number of different speeds, codings, or technical characteristics, VRT 20 processes or modifies the content in any suitable manner to enable and facilitate display of information contained in original content 22 by display 50. This processing may include translating, transcoding, transrating, encoding, rendering, and/or otherwise modifying the bit rate, the frame rate, the resolution, the coding standard, informational content, and/or other suitable characteristics of the received original content 22 in any appropriate manner to facilitate transmission to and/or display by display 50.

The result of this processing, displayable content 24, is then transmitted to streaming server 34 or to set-top box 40. Because VRT 20 is capable of outputting displayable content in an appropriate format, based on the configuration and capabilities of streaming server 34, displayable content 24 may be substantially similar in form to other conventional inputs, such as a satellite or broadcast feed, received by streaming server 34. As a result, in particular embodiments, system 10 may be overlain on conventional content-provision systems, thereby reducing the cost and difficulty associated with implementing the described functionality.

As one example, system 10 may include content sources 12, such as content source 12a in FIG. 1, that represent image repositories capable of storing digital photographs as JPEG files. User 60 may identify an account and password to VRT 20, and VRT 20 may request from content source 12a photographs associated with a particular account maintained by content sources 12a. VRT 20 may then render the JPEG files to produce a video stream suitable for display on a display 50, such as a TV or video telephone. Thus, in certain embodiments, VRT 20 may receive original content 22 as JPEG files and generate displayable content 24 as an MPEG video stream appropriate for viewing on display 50.

As another example, system 10 may include content sources 12, such as content source 12c in FIG. 1, that represent video weblog hosts capable of providing video content that is updated on a regular basis. This video content may be linked to an RSS stream that may also include supporting text, image, and additional meta data to provide context for the video content. VRT 20 may access the linked video content, perform any appropriate processing on the video content, and provide the processed video content to streaming server 34. For example, in particular embodiments, the video weblog host may provide content in a particular video format unsuitable for particular types of display 50 such as TVs, mobile telephones and other portable communication devices. As a result, VRT 20 may transcode and transrate original content 22 to generate displayable content 24 having a different encoding and transmission rate to streaming server 34, so that the video weblog may be viewed at display 50

Additionally, VRT 20 may, in particular embodiments, store advertisements, system announcements, and/or other suitable information in memory. VRT 20 may incorporate this information into displayable content 24 that is transmitted to middleware 30. As a result, in such embodiments, VRT 20 may add advertisements, announcements, or other suitable information to displayable content 24 before transmitting displayable content 24 to middleware 30.

After VRT 20 transmits displayable content 24 to streaming server 34, streaming server 34 may combine displayable content 24 with other content to be provided to user 60 based on the services provided by the operator of streaming server 34. For example, in particular embodiments, streaming server 34 may be operated by a cable television service provider and displayable content 24 may be combined with other channels including content from broadcast television channels and other conventional cable television channels. As a result, in particular embodiments, displayable content 24 may be available on one or more predetermined channels from among the channels offered by this service provider, as will more fully be described with respect to FIGS. 4-7.

Figure 8:
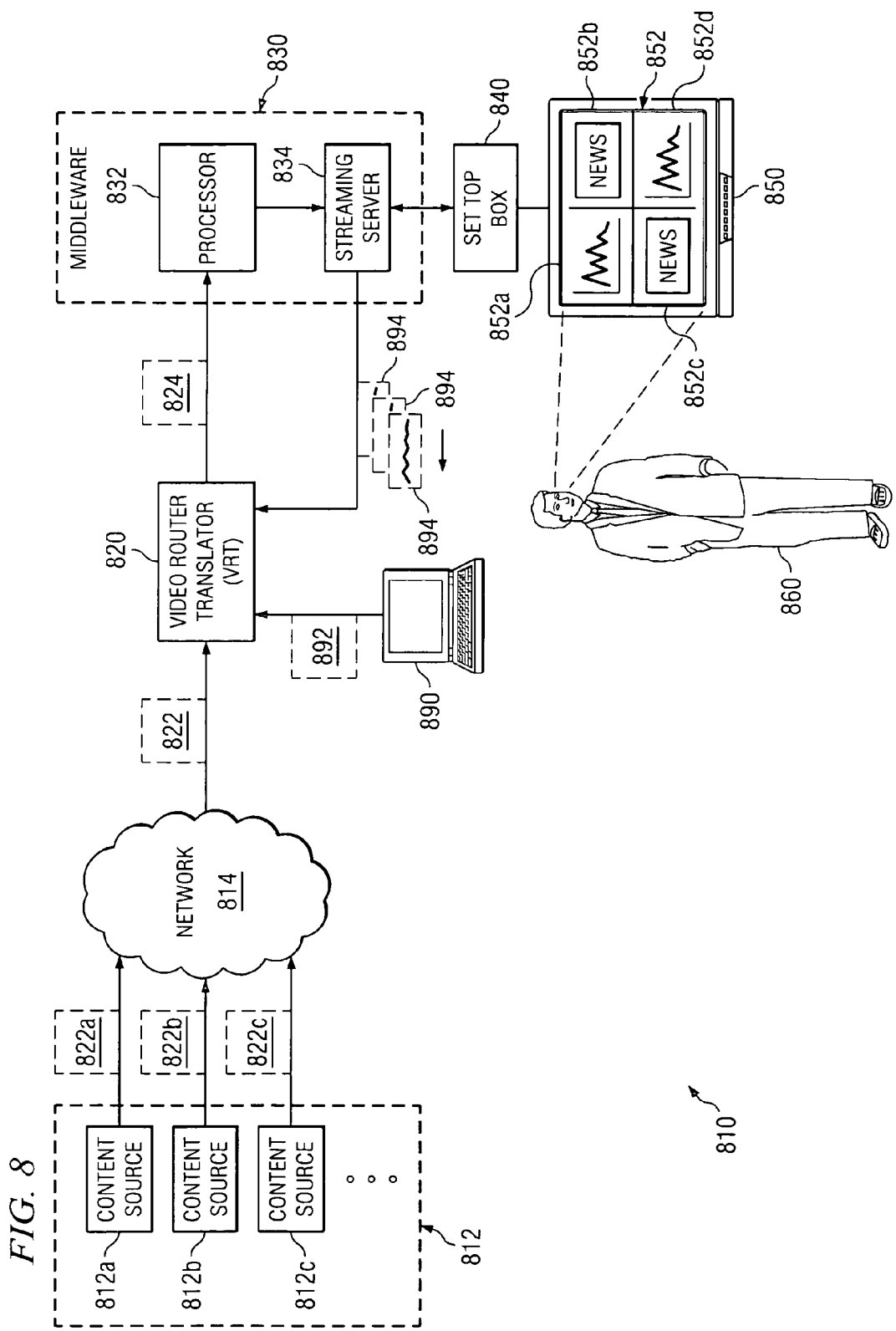
FIG. 8 illustrates operation of a particular embodiment of a system for providing customized content to a display.

Additionally, particular embodiments of VRT 20 may be configured to allow user 60 to configure displayable content 24 from multiple content sources 12 to be displayed on display 50 simultaneously. For example, in particular embodiments, user 60 may identify to VRT 20 four content sources 12 (or any appropriate number of content sources 12) to be simultaneously displayed. VRT 20 may then be able to combine displayable content 24 from these multiple content sources 12 and transmit a combined stream to display 50. As a result, in such an embodiment, display 50 may simultaneously show displayable content 24 received from each of the four content sources 12 in a separate quadrant of a screen of display 50. As discussed in greater detail below, FIG. 8 illustrates an example system configured to provide such functionality.

In particular embodiments, streaming server 34 may also add programming and/or scheduling information to displayable content 24 that provides user 60 with such information. Furthermore, as noted above, streaming server 34 may also be configured to present displayable content 24 to user 60 as part of a video on-demand (VOD) service. As a result, streaming server 34 may be configured to transmit programming information for displayable content 24 on a first predetermined channel indicating the availability of displayable content 24 from various content sources 12 accessible by VRT 20. User 60 may then be able to select a particular content source 12 from which to view displayable content 24, as shown more fully in FIGS. 4-7. Streaming server 34 may then transmit to display 50 displayable content 24 from the requested content source 12 on the predetermined channel in which the programming information is being displayed or on another predetermined channel.

In addition, in particular embodiments, user 60 may control certain aspects of the operation of VRT 20 and/or streaming server 34 by providing input to display 50 or input devices associated with display 50. As one example, user 60 may provide input identifying particular content sources 12 from which user 60 would like to receive displayable content 12. As another example, user 60 may provide input selecting particular displayable content 24 of a content source 12 for display. For example, returning to the photo repository example, user 60 may provide input to select, from among multiple folders available on the photo repository, a folder from which to view displayable content 24. As yet another example, user 60 may provide a user name and/or password to identify an account maintained by a particular content source 12 and associated with user 60. VRT 20 may use this information to access user-specific original content 22 maintained by that content source 12.

In particular embodiments, streaming server 34 and/or VRT 20 may be configured to allow user 60 to control operation using input devices that are standard for display 50, such as a television remote that allows input of alphanumeric characters. Thus, as noted above, VRT 20 may be overlain on existing content-provision systems, thereby reducing the expense and difficulty of installing system 10. In general, however, streaming server 34 and/or VRT 20 may be configured to receive user input from user 60 in any appropriate manner using any appropriate input devices.

Although the description above focuses, for the purposes of illustration, on the operation of an embodiment of system 10 in which VRT 20 transmits displayable content 24 to display 50 via streaming server 34, in particular embodiments, VRT 20 may be configured to alternatively or additionally transmit displayable content 24 to display 50 through set-top box 40 or another type of device co-located with display 50. In such embodiment, set-top box 40 may be responsible for receiving displayable content 24 from VRT 20, for example as a video stream, and combining displayable content 24 with other content received by set-top box 40, such as cable or satellite television inputs, and/or with programming information associated with displayable content 24. Additionally, in such embodiments, set-top box 40 may be responsible for receiving user input from user 60, including source selection information, and transmitting the user input to VRT 20. In such embodiments, streaming server 34 may be omitted from system 10 entirely.

As a result, in particular embodiments, VRT 20 offers a flexible, customizable system for providing various types of content to user 60 of display 50. Moreover, in particular embodiments, VRT 20 can be installed in existing systems, thereby providing an inexpensive way to significantly increase the amount and variety of content available to user 60. Consequently, particular embodiments of system 10 may provide multiple operational benefits. Nonetheless, specific individual embodiments may provide some, none, or all of these benefits.

FIGS. 2A and 2B illustrate collectively the contents and operation of a particular embodiment of video router translator (VRT) 20 and example content sources 12 and displays 50. As shown in FIG. 2A, VRT 20 includes a processor 200 and a memory 210. Additionally, VRT 20, in the illustrated embodiment, contains multiple functional modules including a source monitoring module 212, a format database module 214, a source interface module 220, a routing module 230, a transcoding/transrating module 240, a rendering module 250, a buffering module 260, an authentication module 270, a configuration interface module 280, and a server interface module 290.

Furthermore, certain of these functional modules are divided between a control plane 206 and a data plane 208. Control plane 206 is responsible for maintaining information on content sources 12 accessible by VRT and the codecs, formats, and protocols, supported by VRT 20, while data plane 208 is responsible for processing original content 22 received by VRT 20 to generate displayable content 24. As a result, particular embodiments of VRT 20 may be configured to support dynamic translating of original content 22 instead of being limited to static translation of predetermined formats or types of original content 22. Moreover, in particular embodiments, control plane 206 may continuously sweep the Internet for content sources 12 and may determine the directory structure and appropriate characteristics of content provided by discovered content sources 12, such as the types of content provided by these content sources 12, and the codecs, file sizes, and/or bit rates associated with this content. As described in greater detail below, information describing the directory structure and appropriate characteristics of the content to be provided by the discovered content source 12 may then be stored by VRT 20. When user 60 subsequently requests content from a particular content source 12 for a particular display 50, control plane 206 may then identify an appropriate algorithm for modifying content from the requested content source 12 for transmission to the requested display 50 based, in part, on information stored by VRT 20 describing the relevant content source 12 and/or display 50. Control plane 206 may then instruct data plane 208 to load the identified algorithm and to translate or modify the requested content to the desired format. Once the requested content has been modified, control plane 206 may repeat this process, instructing data plane 208 to load different algorithms, as appropriate, for each subsequent request for content. As a result of this dynamic or continuous changing of the translating algorithm, particular embodiments of VRT 20 may provide a number of benefits over static translators that are dedicated to translation of content having a particular predetermined format.

Returning now to FIG. 2A, numerous example content sources 12 are also shown including static web pages 201, Really Simple Syndication (RSS) feed streams 202, combined web pages, video, and audio content 203, video content 204 and other video/data sources 205. Meanwhile, FIG. 2B illustrates a variety of different displays 50 arranged in different example configuration, including televisions 50a and 50c, mobile phone 50b, and portable media player 50d, and related equipment for providing content to the illustrated displays 50. In this example embodiment of VRT 20, all of these content sources 12, each different in format, data size, speed and other characteristics, are available for input into VRT 20 to be processed and modified into a form suitable for viewing on any of the illustrated displays 50. Although FIG. 2 illustrates a particular number and type of content sources 12 and displays 50, as noted above, system 10 may include any appropriate number, type, and configuration of content sources 12 and displays 50.

Turning to the contents of VRT 20, processor 200 may be a general purpose computer, dedicated microprocessor, or other processing device capable of communicating electronic information. Examples of processor 200 include application-specific integrated circuits (ASICs), field-programmable gate arrays (FPGAs), digital signal processors (DSPs) and any other suitable specific or general purpose processors. Although FIG. 2A illustrates a particular embodiment of VRT 20 that includes a single processor 200, VRT 20 may, in general, include any suitable number of processors 200. In particular embodiments of VRT 20, processor 200 may represent an Opteron quad motherboard that includes four x86 or specialty video-processing microprocessors and four Gigabyte Ethernet (GigE) ports. Configured in this manner, a particular example of VRT 20 may support 300 outgoing MPEG-2 streams to various users 60.

Memory 210 stores original content 22 and displayable content 24 during processing, instructions for processor 200, configuration parameters for VRT 20, and/or any other appropriate information to be used by VRT 20 during operation. In particular embodiments, memory 210 may also store advertisements, system announcements, and other appropriate information to be added to displayable content 24. Memory 210 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices.

Source monitoring module 212 discovers content sources 12 available on network 14. Depending on the configuration of VRT 20, source monitoring module 212 may discover content sources 12 by polling devices operating on network 14 through source interface module 220, receiving information identifying available content sources 12 through configuration interface module 280, and/or executing any other appropriate steps. In particular embodiments, source monitoring module 212 may store information identifying or describing discovered content sources 12 (shown in FIG. 2A as source data 216) in memory 210. Additionally, source monitoring module 212 may store information describing formats, protocols, and/or other characteristics of original content 22 available from discovered content sources 12 to be used to determine appropriate steps for translating original content 22 to displayable content 24 suitable for transmission to and display by display 50.

Format database module 214 maintains information identifying appropriate techniques for translating original content 22. For example, in particular embodiments, format database module 214 may maintain algorithms for converting original content 22 of a particular first format to displayable content 24 of a particular second format appropriate for transmission to and display by display 50. Thus, in particular embodiments, source monitoring module 212 may determine the format associated with original content 22 to be received from a particular content source 12 and, based on the determined format, format database module 214 may determine appropriate steps for translating original content 22 from the relevant source to an appropriate format for transmission to and display by a requesting display 50. Appropriate components of data plane 208 may then translate original content 22 from a first format to a second format compatible with transmission to and display by display 50.

Source interface module 220 facilitates communication between VRT 20 and content sources 12. Source interface module 220 may include components capable of supporting communication between VRT 20 and network 14, in general, such as a Network Interface Card (NIC). Additionally, source interface module 220 may include components configured to specifically interact with content sources 12. For example, in particular embodiments, source interface module 220 may include components responsible for adding a header to XML pages included in RSS feeds received from 202 by VRT 20. In particular embodiments, source interface module 220 may represent, in part, an application programming interface (API) through which VRT 20 receives content source data.

Routing module 230 identifies appropriate content sources 12 for VRT 20 to communicate with and prepares data for communication to the relevant content sources 12. In particular embodiments, routing module 230 may maintain address information for content sources 12 and may be responsible for determining addresses for content sources 12 from which routing module 230 requests original content 22. Additionally, routing module 230 may be responsible for packetizing, framing, or otherwise segmenting requests and other information to be transmitted to content sources 12. In particular embodiments, VRT 20 may utilize Multiprotocol Label Switching (MPLS) for communication with content sources 12, and routing module 230 may be capable of adding MPLS labels to information for transmission to content sources 12.

Transcoding/transrating module 240 processes original content 22 to produce displayable content 24. Transcoding/transrating module 240 may perform a variety of different processing functions based on the format of the relevant original content 22 and the capabilities of the requesting display 50. In particular embodiments, transcoding/transrating module 240 may be responsible for transcoding original content 22 from a first encoding format to a second encoding format appropriate for display on the relevant displays 50. Similarly, in particular embodiments, transcoding/transrating module 240 may be responsible for transrating original content from a first transmission rate to a second transmission rate appropriate for display and/or transmission to display 50. More generally, although referred to as a "transcoding/transrating" module, transcoding/transrating module 240 may be responsible for providing any processing operations appropriate for transforming original content 22 to a format appropriate for displayable content 24. For example, in particular embodiments, transcoding/transrating module 240 may be responsible for performing various types of video and/or audio filtering on content processed by transcoding/transrating module 240. Transcoding/transrating module 240 may also add advertisements, announcements, and other additional information to displayable content 24 before displayable content 24 is transmitted to middleware 30.

In particular embodiments, the processing performed by transcoding/transrating module 240 is performed realtime. Additionally, VRT 20 may be configured so that the processing performed by transcoding/transrating module 240 on a particular stream of original content 22 may be completed and the processed original content 22 may be stored in VOD storage 38 until requested by user 60. Moreover, in particular embodiments, VRT 20 may determine, based on the frequency with which original content 22 from a particular content source 12 is requested, whether to process the relevant original content 30 realtime in response to requests or to process and store the original content 30 for subsequent requests. For example, after particular original content 22 has been requested by a threshold number of users, transcoding/transrating module 240 may process the relevant original content 22 and store the resulting displayable content 24 in memory 210, and VRT 20 may used the stored displayable content 24 to respond to subsequent requests for that displayable content 24. Consequently, particular embodiments of VRT 20 may optimize use of routing and/or processing resources in system 10.

Rendering module 250, when appropriate, renders text and static images in original content 22 as a video stream appropriate for display on a video-capable display 50*a-d*. As a result, text and static images, such as digital photographs, may be accessed by VRT 20 and provided as a conventional input to a video-capable display 50*a-d*. Rendering module 250 may use any appropriate techniques for rendering the video stream that is output as displayable content 24.

Buffering module 260 stores original content 22 prior to processing by transcoding/transrating module 240 and rendering module 250. As a result, buffering module 260 allows text files and static images to be properly arranged and spaced within the stream of displayable content 24 generated by transcoding/transrating module 240 and rendering module 250. Additionally, buffering module 260 may store displayable content prior to transmission to streaming server 40 or set-top box 70. Buffering module 260 may include all or a portion of memory 210.

Authentication module 270 interacts with content sources 12 to authenticate the identity of VRT 20 and/or a user 60 currently being served by VRT 20. In particular embodiments, authentication module 270 may store passwords associated with access to various content sources 12 in a password database maintained in memory 210. Authentication module 270 may transmit those passwords to appropriate content sources 12 to authorize access to original content 22 provided by those content sources.

Additionally, in particular embodiments, content sources 12 may be configured to provide specialized original content 22 to VRT 20 that differs from that provided to users requesting original content 22 from those content sources 12 through other techniques. For example, in particular embodiments, a particular content source 12 may make multiple copies of a particular encoded video segment having different transmission rates available to users accessing content sources 12 directly through personal computers 282. The content source 12 in question may additionally maintain a copy of the video segment in its original form that content source 12 does not otherwise provide to users, but that content source 12 may make available to VRT 20. As a result, VRT 20 may be able to provide user 60 with higher-quality video stream than user 60 would view by accessing one of the encoded copies of the video segment through PC 282. In such an embodiment, authentication module 270 may be responsible for interacting with the relevant content source 12 to indicate to that content source 12 that VRT 20 is, in fact, a content router, and that content source 12 should respond to requests from VRT 20 with the appropriate version of original content 22.

Configuration interface module 280 allows an operator of VRT 20 to configure VRT 20. Configuration interface module 280 may include any appropriate components to allow the operator to input information associated with the configuration of VRT 20. Configuration information input through configuration interface module 280 may be stored in memory 210.

In particular embodiments, VRT 20, when properly configured may be capable of operating with any of a number of different types of streaming servers 34. As a result, VRT 20 may store one or more configuration profiles 222 each associated with a particular vendor and/or model of streaming server 34. Each configuration profile 222 contains information defining appropriate configuration parameters for the associated vendor and/or model. During installation or at any appropriate time during operation, the operator may select one or more of these configuration profiles 222 based on the vendor and/or model for the streaming server 34 with which VRT 20 is currently operating.

Server interface module 290 facilitates communication between VRT 20 and streaming server 34. In particular embodiments, server interface module 290 receives requests from streaming server 34 and other information transmitted by user 60 to VRT 20. Although FIG. 2A illustrates a particular embodiment of VRT 20 configured to operate with streaming server 34, alternative embodiments of VRT 20 may be configured to operate with set-top box 40. As a result, particular embodiments of VRT 20 may include, in addition to or instead of server interface module 290, a set-top interface module capable of facilitating communication between VRT 20 and set-top box 40.

Each of source interface module 210, routing module 220, transcoding/transrating module 230, rendering module 240, buffering module 250, authentication module 260, and configuration interface module 270 may comprise any appropriate combination of hardware and/or software suitable to provide the described functionality. Additionally, any two or more of the described modules may represent or include, in part or in whole, shared components. As one example, in particular embodiments, each of the modules represents, in part, a software process running on processor 200 as a result of processor 200 executing processor instructions stored in memory 210. Moreover, in particular embodiments, control plane 206 represents, in part or in whole, an application server operating on VRT 20.

In addition to the contents of VRT 20, FIGS. 2A and 2B illustrate a variety of different display configurations 90a-d. Each display configuration 90 includes a display 50 and additional equipment to facilitate transmission of displayable content 24 to that particular display 50. For example, display configuration 90a illustrates a system that may be overlaid on an existing television system and includes middleware 30 and set-top box 40 operated by television signal provider 284 for providing displayable content 24 to television 50a. By adding VRT 20 to an existing set of middleware 30 and set-top box 40, a provider of conventional television content such as a cable multi-service operator (MSO), telecommunication service provider, satellite television service provider, or Internet Protocol television (IPTV) service provider may provide subscribers with access to displayable content 24 provided by Internet-based content sources 12 through television 50a.

Additionally, user 60 may utilize PC 282 to configure an account maintained by television signal provider 284 that is associated with user 60. For example, user 60 may use PC 282 to enter an ID and/or password to be used to access specific content maintained by one of content sources 12, to select a particular content source 12 from which to request original content 22, to set display preferences for displayable content 24 to be provided to user 60, and/or to control any other appropriate aspect of the operation of VRT 20. Furthermore, user 60 may also use VOD storage 38 to store displayable content 24 provided by VRT 20.

Similarly, display configuration 90b illustrates a system that may be overlaid on an existing mobile communication system and includes an Internet Management System (IMS) application server 288 and a mobile network 292 operated by mobile communications provider 286 to provide displayable content 24 to a mobile phone 50b. By adding VRT 20 to an existing IMS server 288 and mobile network 292, a mobile-communication service provider may provide user 60 with access to displayable content 24 provided by Internet-based content sources 12 through mobile phone 50b. As a result, particular embodiments of system 10 may provide an easy solution for offering Internet-based displayable content 24 to users 60 of an existing mobile communication system.

Meanwhile, display configuration 90c illustrates a system in which television media outlet 295 may choose to access displayable content 24 provided by search engine provider 294 and incorporate this displayable content 24 into content television media outlet 295 is providing to user 60. As one specific example, television media outlet 295 may represent a broadcast television network that chooses to access video content that is streamed from NASA TV and provided to television media outlet 296 by Google and to incorporate that video content into its broadcast television feed. This broadcast feed may then be transmitted to user 60 to be viewed on television 50c.

Also shown in FIG. 2B is display configuration 90d, which includes content server 297 operated by third-party media provider 296 for providing displayable content 24 to portable media player 50d through internet 298 and PC 299. Display configuration 90d illustrates a system in which user 60 can access content collected from one or more content sources 12 by a third-party content provider 296 and stored on content server 297. Third-party content provider 296 may offer any appropriate selection of content derived from content sources 12. In particular embodiments, the content offered on content server 297 may include specific types of content, content for specific users 60, and/or content selected based on any other suitable characteristic or criteria. In the illustrated example, third-party content provider 296 offers content appropriate for viewing on a particular type of display 50, such as portable media player 50d. In this example, portable media player 50d may represent any portable device, such as a video-enabled iPod, capable of displaying particular types of stored and/or received digital media. As a result, user 60 may access content server 297 through Internet 298 using PC 299 and download displayable content 24 to portable media player 50d.

Thus, as noted above, VRT 20 may be configured to receive original content 22 from multiple different content sources 12 that provide content in a variety of different formats. Furthermore, VRT 20 may process this received original content 22 to make original content 22 compatible with transmission to any number of different types of display 50 that are configured to receive displayable content 24 in any appropriate manner. As a result, VRT 20 may significantly increase the number and variety of content sources 12 that a user 60 of a particular display 50 can access.

FIGS. 3-6 illustrate an example electronic programming guide (EPG) 300 and associated title lists 400-600 that may be displayed by display 50 in particular embodiments of system 10. As noted above, particular embodiments of display 50 may be configured to receive and display scheduling information from appropriately configured VRTs 20 and/or streaming servers 34 to facilitate the selection of on-demand content by user 60. The EPG illustrated by FIGS. 3-6 is one example of how such scheduling information may be structured and displayed by particular displays 50. Alternative embodiments of system 10 may utilize an EPG structured or displayed in any other appropriate manner.

In particular embodiments, VRT 20 may populate a conventional VOD database of streaming server 34 based on information collected by VRT 20. Thus, particular embodiments of streaming server 34 may generate EPG 300 for use by user 60 that utilizes scheduling information stored in the VOD system. As a result, particular embodiments of VRT 20 may be utilized in system 10 to populate a conventional VOD system with little or no modification to the VOD system. Thus, particular embodiments of VRT 20 may be easily incorporated into existing content-delivery systems to allow transmission of displayable content 24 to display 50 in conjunction with conventional video-on-demand content as shown in FIGS. 3-6.

FIG. 3 illustrates EPG 300 that shows certain programming options offered by middleware 30. EPG 300 is, for example, displayed on a display 50 for viewing and selection by a user 60. In the illustrated example, the service provider operating middleware 30 offers multiple channels for viewing and selection by user 60 and each channel is represented in EPG 300 by a channel entry 310. For certain channels with predetermined programming schedules (such as channels associated with channel entries 310a-e), the corresponding channel entries 310 may include one or more time fields 320 providing programming information specific to the relevant time periods. User 60 may utilize user interface components associated with display 50, such as a television remote control, to navigate and select the programming information provided in EPG 300. In particular, user 60 may utilize these user interface components to indicate to display 50 and/or middleware 30 the selection of a particular channel entry 310 or time field 320.

Figure 5:
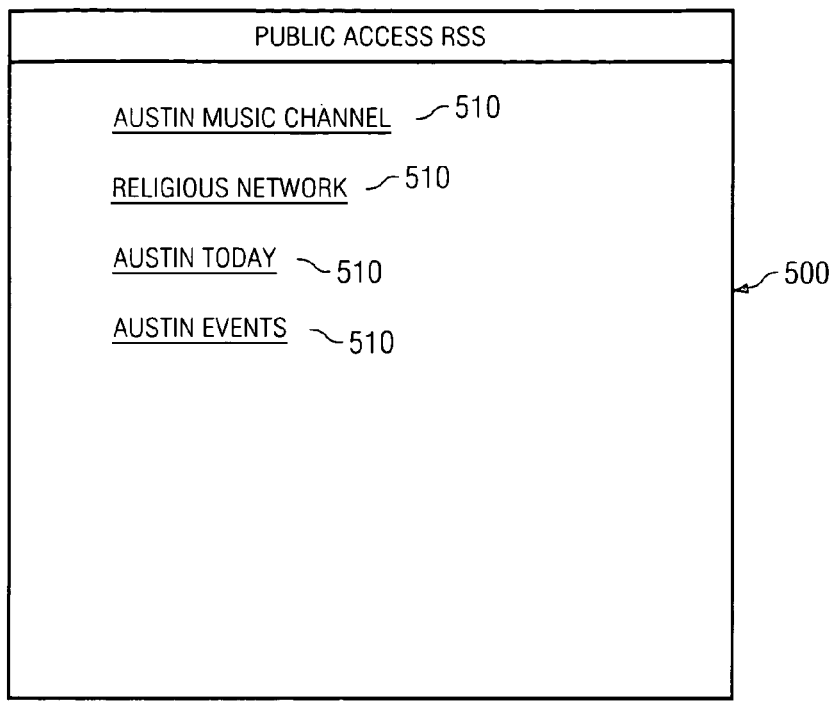
FIG. 5 is an illustration of another Internet video-on-demand selection from the EPG of FIG. 3.
Figure 6:
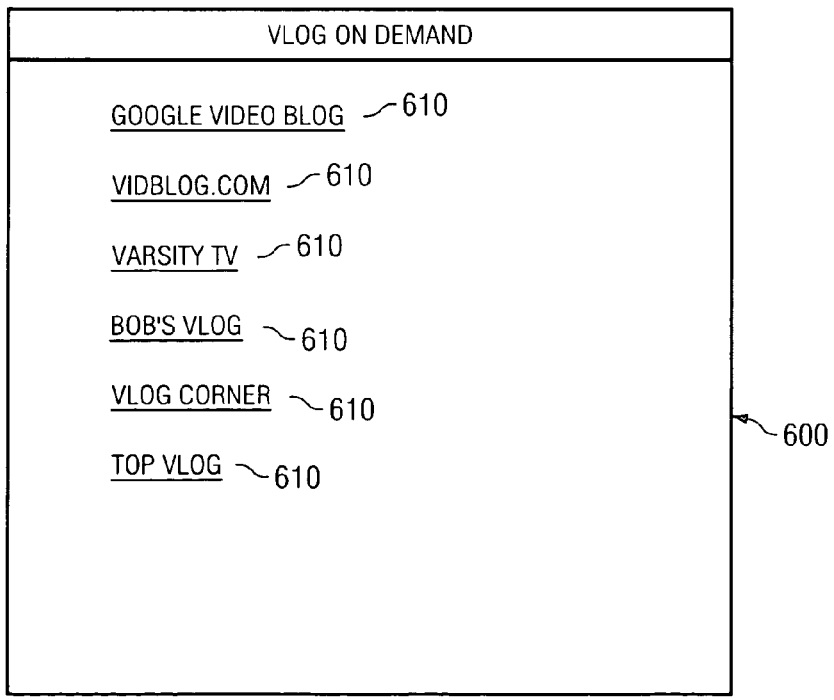
FIG. 6 is an illustration of yet another Internet video-on-demand selection from the EPG of FIG. 3.

In the illustrated embodiment, EPG 300 includes three channel entries 310, channel entries 310f-h, associated with displayable content 24 presented as part of video-on-demand (VOD) service. By selecting one of the channel entries 310 associated with displayable content 12, user 60 will cause display 50 to transmit a request to streaming server 34 to request VOD information associated with the selected channel entry 310. Streaming server 34 may then transmit a list of content sources 12 associated with the selected channel entry 310 to display 50. In particular embodiments, a conventional VOD database may be populated with one or more such lists of content sources 12 and streaming server 34 may retrieve an appropriate title list in response to a request from user 60. Display 50 may then display the retrieved title list to user 60. Selection of channel entries 310a-e will result in conventional TV channels being displayed on TV 50. FIGS. 4-6 illustrate the display of example scheduling information by display 50 in response to selection of channel entries 310f-h respectively.

FIG. 4 illustrates an example of a title list 400 that is transmitted to display 50 in response to user 60 selecting channel entry 310f in EPG 300 of FIG. 3. Title list 400 is a list of content sources 12 accessible by VRT 20 and associated with a plurality of on-demand RSS feeds from predetermined content sources 12 selected for presentation by the operator of middleware 30. User 60 may choose to receive displayable content 24 from a particular content source 12 in title list 400 by selecting a particular title entry 410 in title list 400. One important aspect of the invention is the ability to display content from title list 400 that would not be able to be received and displayed by display 50 in a conventional system because of the incompatible formats of the desired content.

In particular embodiments, these content sources 12 may represent content sources 12 that specifically require authentication and/or predetermined customized translation. For example, content sources 12 in title list 400 may require rendering of still photos into a video format or the transmission of a specific password. In particular embodiments, control plane 206 of VRT 20 may collect information specifying the codec and/or format used by content sources 12 included in title list 400 and/or other additional information related to communication with these content sources 12. As a result, VRT 20 may maintain a predetermined list of content sources 12 (such as title list 400) that includes particular content sources 12 that are specifically selected by the operator for presentation to users 60 or for which VRT 20 possesses appropriate translation or authentication information.

FIG. 5 illustrates an example of a title list 500 that may be transmitted to and viewed on display 50 in response to user 60 selecting channel entry 310g in EPG 300 of FIG. 3. In the illustrated example, title list 500 includes title entries 510 associated with "public-access" content sources 12. Because particular embodiments of middleware 30 may also be configured to allow access to a dynamic collection of content sources 12, EPG 300 may include a channel entry 310 dynamically associated with an open-ended set of content sources 12. Content sources 12 included in this collection may be discovered by control plane 206 of VRT 20 (as described above with respect to FIGS. 2A and 2B), specified by user 60, or identified in any appropriate manner based on the configuration and capabilities of VRT 20 and/or other appropriate components of system 10. As a result, title list 500 may be dynamically generated by source monitoring module 212 and/or may change in response to the addition or removal of content sources 12 to system 10. Again, the present system thus enables user 60 to select and view public access content from a variety of content sources having a variety of format characteristics.

FIG. 6 illustrates an example of a title list 600 that may be transmitted to and viewed on display 50 in response to user 60 selecting channel entry 310h in EPG 300 of FIG. 3. In the illustrated example, title list 600 includes title entries 610 specifically associated with content sources 12 offering video weblogs ("vlogs"). As illustrated by title list 600, EPG 300 may include separate channel entries 310 for content sources 12 of a specific type, for content sources 12 associated with a specific subject, or for a group of content sources selected based on any appropriate characteristic or consideration. As a result, EPG 300 may provide a flexible mechanism for grouping and presenting content sources 12 to user 60. These content sources 12 may have formats, speeds, and other characteristics that ordinarily would not be available for viewing on display without the processing and modifying by VRT 20.

Figure 7B:
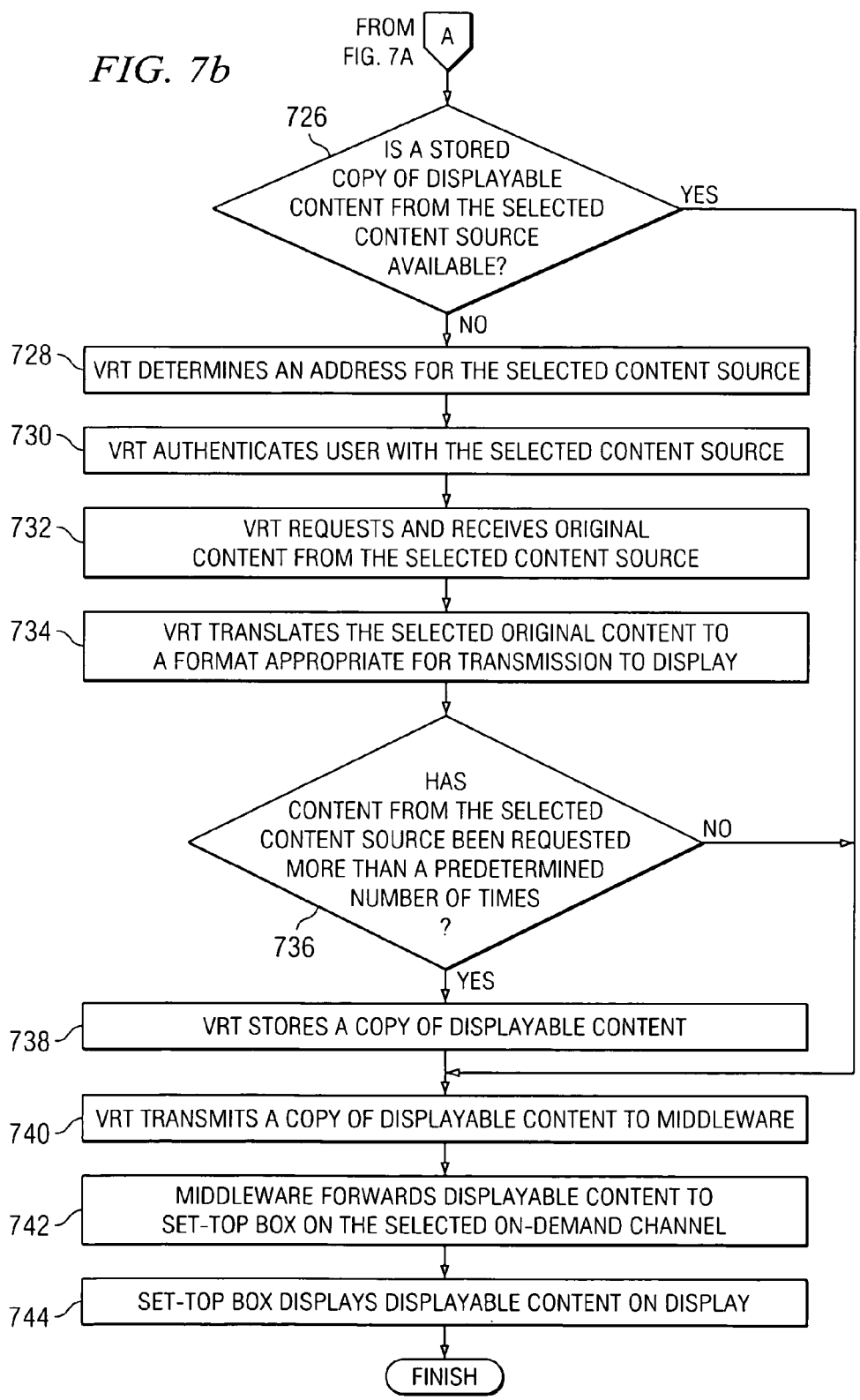
FIG. 7 is a flowchart illustrating steps in the operation of a particular embodiment of the system shown in FIGS. 1 and 2.

FIG. 7 is a flowchart illustrating steps in the operation of a particular embodiment of the system shown in FIGS. 1 and 2. Some of the steps illustrated in FIG. 7 may be combined, modified, or deleted where appropriate, and additional steps may also be added to the flowchart. Additionally, steps may be performed in any suitable order without departing from the scope of the invention.

Operation begins at step 700 with set-top box 40 querying middleware database 36 to populate on-demand titles of electronic programming guide (EPG) 300. Set-top box 40 displays EPG 300 on display 50 at step 702. User 60 then selects a channel from EPG 300 provided by set-top box 40 at step 704. User 60 may select the channel in any appropriate manner based on the configuration and capabilities of set-top box 40.

In response to the channel selection by user 60, middleware 30 determines, at step 706, whether the selected on-demand channel derives its content from content sources 12 accessible by VRT 20. If not, middleware 30 determines the titles associated with the selected channel by accessing database 36 and transmits information identifying these titles to set-top box 40 at step 708 for display on display 50. User 60 then selects one of the titles associated with the selected channel at step 710. Middleware 30 then transmits a video stream of the selected title to set-top box 40 at step 712 for display on display 50. Operation of system 10 may then end as shown in FIG. 7.

If, instead, middleware 30 determines at step 706 that the selected on-demand channel derives its content from content sources 12 accessible by VRT 20, then middleware 30 queries VRT 20 to request titles associated with that on-demand channel at step 714. VRT transmits the requested titles to middleware 30 at step 716. At step 718, middleware 30 uses the requested titles to populate an entry in database 36 associated with the selected channel. At step 720, middleware 30 then transmits the requested titles to set-top box 40 for display on display 50. After the titles associated with the selected on-demand channel have been displayed on display 50, user 60 selects a particular title associated with the selected on-demand channel at step 722. At step 724, set-top box 40 then queries VRT through middleware 30 for displayable content 24 from a content source 12 associated with the selected title. In response to the query, VRT 20 determines, at step 726, whether a stored copy of displayable content 24 from the selected content source 12 is stored in memory 210. If so, operation may then continue at step 740.

If no copy of displayable content 24 from the requested content source 12 is stored in memory 210, VRT 20 determines an address for the selected content source 12 at step 728. In particular embodiments, VRT 20 may authenticate user 60 with the selected content source 12 at step 730. VRT 20 may authenticate user 60 by forwarding authentication information (such as a user identifier and/or password) entered by user 60 following selection of the source, by identifying stored authentication information associated with an account of the user and transmitting this authentication information to the selected content source 12, and/or by completing any other appropriate steps to identify user 60 and/or VRT 20 to the selected content source 12. At step 732, VRT 20 then requests and receives original content 22 from the selected content source 12 over network 14.

Upon receiving the requested original content 22 from selected content source 12, VRT 20, at step 734, translates the selected original content 22 to a format appropriate for transmission to and display by display 50. As part of translating original content 22, VRT 20 may transcode, transrate, encode, decode, render and/or otherwise modify original content 22 in realtime to produce displayable content 24 appropriate based on the requirements of display 50 and/or a network associated with display 50. In particular embodiments, VRT 20 may also, at step 736, determine whether content from the selected content source 12 has been requested more than a predetermined number of times. If so, VRT 20 may also store a copy of displayable content 24 for satisfying future requests at step 738.

VRT 20 then transmits a copy of displayable content 24 from the requested content source 12 to middleware 30 at step 740. Middleware 30 then forwards displayable content 24 received from VRT 20 to set-top box 40 on the selected on-demand channel at step 742. At step 744, set-top box 40 displays displayable content 24 on display 50. Operation of system 10 may then end as shown in FIG. 7.

FIG. 8 is a diagram illustrating an example technique for customizing content provided to a display 50. As noted above, particular embodiments of the described VRT may be configured to customize processing of content for delivery to a particular user or group of users. FIG. 8 illustrates one example of how particular embodiments of the VRT may be configured to perform such display customization. In particular, FIG. 8 illustrates a system 810 capable of combining content from multiple content sources 812 and/or from multiple conventional channels 894 offered by VRT 820 for simultaneous viewing by user 860. In the illustrated embodiment, system 810 includes a VRT 820, middleware 830 (including middleware processor 832 and streaming server 834), a display 850, content sources 812, and network 814, all similar in content and operation to components of the same name in FIG. 1.

During operation of system 810, user 860 may utilize PC 890 to communicate channel configuration information 892 to VRT 820. Channel configuration information 892 may represent any appropriate information, in any appropriate form, that define preferences relating to scheduling, choice of content, and/or any other suitable aspects of content provision. For example, in particular embodiments, channel configuration information 892 may represent an HTML request transmitted to VRT 820 that identifies two or more content sources 812 accessible by VRT 820 and/or other types of conventional content provided by streaming server 834.

Alternatively, channel configuration information 892 may be transmitted from the user through the set top box 840 or by other means.

VRT 820 receives channel configuration information 892 from PC 890 and stores channel configuration information 892. Additionally, VRT 820 receives original content 822 from content sources 812 as described above with respect to FIG. 1. VRT 820 may then perform any appropriate processing and/or modifying of original content 822 received from content sources 812 as described above with respect to FIGS. 1 and 2. In the illustrated embodiment of system 810, VRT 820 also receives one or more video streams (shown generically in FIG. 8 as "channels 894") from streaming server 834.

Based on channel configuration information 892, VRT 820 modifies all or a portion of original content 822 and/or all or a selected subset of the channels 894 received from VRT 820 to customize the content delivered to display 850. For example, VRT 820 may combine content received from a particular content source 812 with content received from one or more other content sources 812 and/or one or more channels 894 received from streaming server 834. More specifically, in particular embodiments, VRT 820 may receive channel configuration information 892 from user 860 that identifies one or more selected content sources 812 accessible by VRT 820 and/or one or more selected channels 894 offered by streaming server 834. VRT 820 may then combine content from the selected content sources 812 and/or selected channels 894 for transmission to middleware 830 as a single video stream, shown in FIG. 8 as combined content 824. Streaming server 834 may then deliver combined content 824 to display 850 along with other conventional content delivered by streaming server 834. In particular embodiments, streaming server 834 may transmit combined content 824 to display 850 on a predetermined channel designated for transmission of customized content.

As part of combining the relevant content, VRT 820 may perform any suitable processing or modification of content from any or all of the selected content sources 812 and/or selected channels 894 to facilitate combination of the relevant content. As one example of such processing, VRT 820 may identify, from among the selected content sources 812 and selected channels 894, sources or channels that are providing full-screen video streams and transrate content received from these sources or channels, thereby reducing the display size of the relevant content. As a result of this transrating, VRT 820 may then be able to combine the content received from the selected content sources 812 and/or channels 894 into a single video stream so that content from all of the full-screen video streams can be combined for simultaneously viewing on display 850.

Display 850 may then display combined content 824 received from VRT 820. The content from the various selected sources and/or channels 894 may be structured in any appropriate manner when displayed by display 850. For example, in particular embodiments, user 860 may select four content sources 812 and/or channels 894 from which to view content. Moreover, display 850 may include a screen 852 that can be divided into four screen portions 854*a-d*. When user 860 tunes to a predetermined channel for delivery of customized content, content from each of these four content sources 812 or channels 894 may then be simultaneously displayed in a separate screen portion 854 of screen 852. In general, however, VRT 820 and display 850 may be configured so that the desired content is processed so that combined content 824 can be displayed in any appropriate manner by display 850.

As a result, user 860 may be able to simultaneously view content from a selected plurality of the selected content sources 812 or channels 894. This may enhance user's use or enjoyment of the content being provided by content sources 812 and middleware 830. As one benefit, in particular embodiments, user 860 may select multiple content sources of high-importance for simultaneous viewing to allow for constant monitoring of all the selected content sources 812 and channels 894. Thus, a stock-broker desiring to monitor both financial news and specific stock prices may be able to configure VRT 820 to combine a stock ticker provided by a designated content source 812 as an RSS feed with content from a conventional news channel provided by middleware 830 as a video stream. Similarly, a sports fan desiring to monitor both live action in a football game and player statistics may be able to configure VRT 820 to combine a video stream of the game provided by middleware 830 with an RSS feed containing realtime player statistics provided by a particular content source 812.

As another benefit, user 860 may be able to select multiple content sources 812 and/or channels 894 providing related content and configure VRT 820 to display the relevant content so that the user can utilize the content simultaneously, such as to compare information provided by multiple sources. Thus, a participant in online auctions may be able to monitor prices displayed for two similar objects to determine which to purchase and how much to bid. Similarly, a viewer of a television program on a particular subject may be able to configure VRT 820 to display an RSS feed from one or more websites that provide supplementary information on the same subject.

In addition, user 860 may be able to view combined content 824 on a display 50, such as a conventional television, that traditionally supports very little customization. As a result, certain embodiments of VRT 820 may provide numerous benefits. Nonetheless, particular embodiments may provide all, some, or none of the described benefits.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. One or more computer-readable non-transitory storage media embodying logic is operable when executed to:
   receive source data describing content provided by each of a plurality of packet-based content sources and by each of a plurality of video service providers, different content from different ones of the packet-based content sources having different format characteristics, the content from each of the packet-based content sources having one or more format characteristics that is incompatible with transmission over an Internet Protocol Television (IPTV) network or viewing on a display associated with a user;
   store the content source data in memory as a source list;
   select at least one of the packet-based content sources from the plurality of packet-based content sources to receive corresponding content and at least one of the plurality of video service providers to receive a video stream in response to a request from the user based on the source list;
   request the corresponding content from a selected packet-based content source and the video stream from a selected video service provider;
   identify, based at least in part on the source data, one or more algorithms suitable to modify the corresponding content from the selected packet-based content source and the video stream from the selected video service provider to be compatible with transmission over the IPTV network and viewing on the display;

modify the corresponding content and the video stream based on one or more of the identified algorithms to generate displayable content; and transmit the displayable content to the display to simultaneously display the corresponding content and the video stream selected in response to the request based on the source list.

2. The media of claim 1, wherein the logic is further operable when executed to modify the content by translating the content to one of a Moving Picture Experts Group-2(MPEG-2) format or a Moving Picture Experts Group-4(MPEG-4) format.

3. The media of claim 1, wherein the logic is further operable when executed to:

request and receive the content from the at least two of the plurality of content sources by requesting and receiving still digital images from the content sources; and modify the content by rendering the still digital images into a video stream.

4. The media of claim 1, wherein the logic is further operable when executed to authenticate the user with one of the at least two of the plurality of content sources from which the content is being requested.

5. The media of claim 1, wherein the logic is further operable when executed to request information from a plurality of control sources and to combine the information for simultaneous viewing on the display.

6. The media of claim 1, wherein the logic is further operable when executed to add one of an announcement and an advertisement to the displayable content.

7. The media of claim 1, wherein the content is requested via an electronic program guide comprising the list of packet-based content sources available to provide content based on the content source data associated with the display.

8. A method comprising, by one or more computer systems:

receiving source data describing content provided by each of a plurality of packet-based content sources and by each of a plurality of video service providers, different content from different ones of the packet-based content sources having different format characteristics, the content from each of the packet-based content sources having one or more format characteristics that is incompatible with transmission over an Internet Protocol Television (IPTV) network or viewing on a display associated with a user;

storing the content source data in memory as a source list;

selecting at least one of the packet-based content sources from the plurality of packet-based content sources to receive corresponding content and at least one of the plurality of video service providers to receive a video stream in response to a request from the user based on the source list;

requesting the content from a selected packet-based content source and the video stream from a selected video service provider;

identifying, based at least in part on the source data stored in the memory, one or more algorithms suitable to modify the content from the selected packet-based content source and the video stream from the selected video service provider to be compatible with transmission over the IPTV network and viewing on the display;

modifying the content and the video stream based on one or more of the identified algorithms to generate displayable content; and transmitting the displayable content to the display to simultaneously display the corresponding content and the video stream selected in response to the request based on the source list.

9. The method of claim 8, wherein modifying the requested content comprises translating the requested content to one of a Moving Picture Experts Group-2 (MPEG-2) format or a Moving Picture Experts Group-4 (MPEG-4) format.

10. The method of claim 8, wherein another one of the at least two of the packet-based content sources provides.

11. The method of claim 8, further comprising authenticating the user with one of the at least two of the packet-based content sources from which the content is being requested.

12. The method of claim 8, wherein the content is requested via an electronic program guide comprising the list of packet-based content sources available to provide content based on the content source data associated with the display.

13. The method of claim 8, further comprising adding an advertisement to the displayable content.

14. The method of claim 8, further comprising requesting information from a plurality of control sources and combining the information for simultaneous viewing on the display.

15. An apparatus comprising:

one or more communication interfaces; and one or more computer-readable non-transitory storage media embodying logic that is operable when executed to:

receive source data describing content provided by each of a plurality of packet-based content sources and by each of a plurality of video service providers, different content from different ones of the packet-based content sources having different format characteristics, the content from each of the packet-based content sources having one or more format characteristics that is incompatible with transmission over an Internet Protocol Television (IPTV) network or viewing on a display associated with a user;

store the content source data in memory as a source list;

select at least one of the packet-based content sources from the plurality of packet-based content sources to receive corresponding content and at least one of the plurality of video service providers to receive a video stream in response to a request from the user based on the source list;

request the content from a selected packet-based content source and the video stream from a selected video service provider;

identify, based at least in part on the source data, one or more algorithms suitable to modify the content from the selected packet-based content source and the video stream from the selected video service provider to be compatible with transmission over the IPTV network and viewing on the display;

modify the content and the video stream based on one or more of the identified algorithms to generate displayable content; and transmit the displayable content to the display to simultaneously display the corresponding content and the video stream selected in response to the request based on the source list.

16. The apparatus of claim 15, wherein the logic is further operable when executed to add an advertisement to the displayable content.

17. The apparatus of claim 15, wherein the logic is further operable when executed to modify the content by translating the content to one of a Moving Picture Experts Group-2 (MPEG-2) format or a Moving Picture Experts Group-4 (MPEG-4) format.

18. The apparatus of claim 15, wherein the logic is further operable when executed to:
   request and receive the content from the at least two of the plurality of content sources by requesting and receiving still digital images from the content sources; and
   modify the content by rendering the still digital images into a video stream.

19. The apparatus of claim 15, wherein the logic is further operable when executed to authenticate the user with one of the at least two of the plurality of content sources from which the content is being requested.

20. The apparatus of claim 15, wherein the logic is further operable when executed to request information from a plurality of control sources and to combine the information for simultaneous viewing on the display.

21. The apparatus of claim 15, wherein the content information is requested via an electronic program guide comprising the list of packet-based content sources available to provide content based on the content source data associated with the display.

22. A system comprising:
   means for receiving source data describing content provided by each of a plurality of packet-based content sources and by each of a plurality of video service providers, different content from different ones of the packet-based content sources having different format characteristics, the content from each of the packet-based content sources having one or more format characteristics that is incompatible with transmission over an Internet Protocol Television (IPTV) network or viewing on a display associated with a user;
   means for storing the content source data in memory as a source list;
   means for selecting at least one of the packet-based content sources from the plurality of packet-based content sources to receive corresponding content and at least one of the plurality of video service providers to receive a video stream in response to a request from the user based on the source list;
   means for requesting the content from a selected packet-based content source and the video stream from a selected video service provider;
   means for identifying, based at least in part on the source data, one or more algorithms suitable to modify the content from the selected packet-based content source and the video stream from the selected video service provider to be compatible with transmission over the IPTV network and viewing on the display;
   means for modifying the content and the video stream based on one or more of the identified algorithms to generate displayable content; and
   means for transmitting the displayable content to the display to simultaneously display the corresponding content and the video stream selected in response to the request based on the source list.

* * * * *